Figure 1:
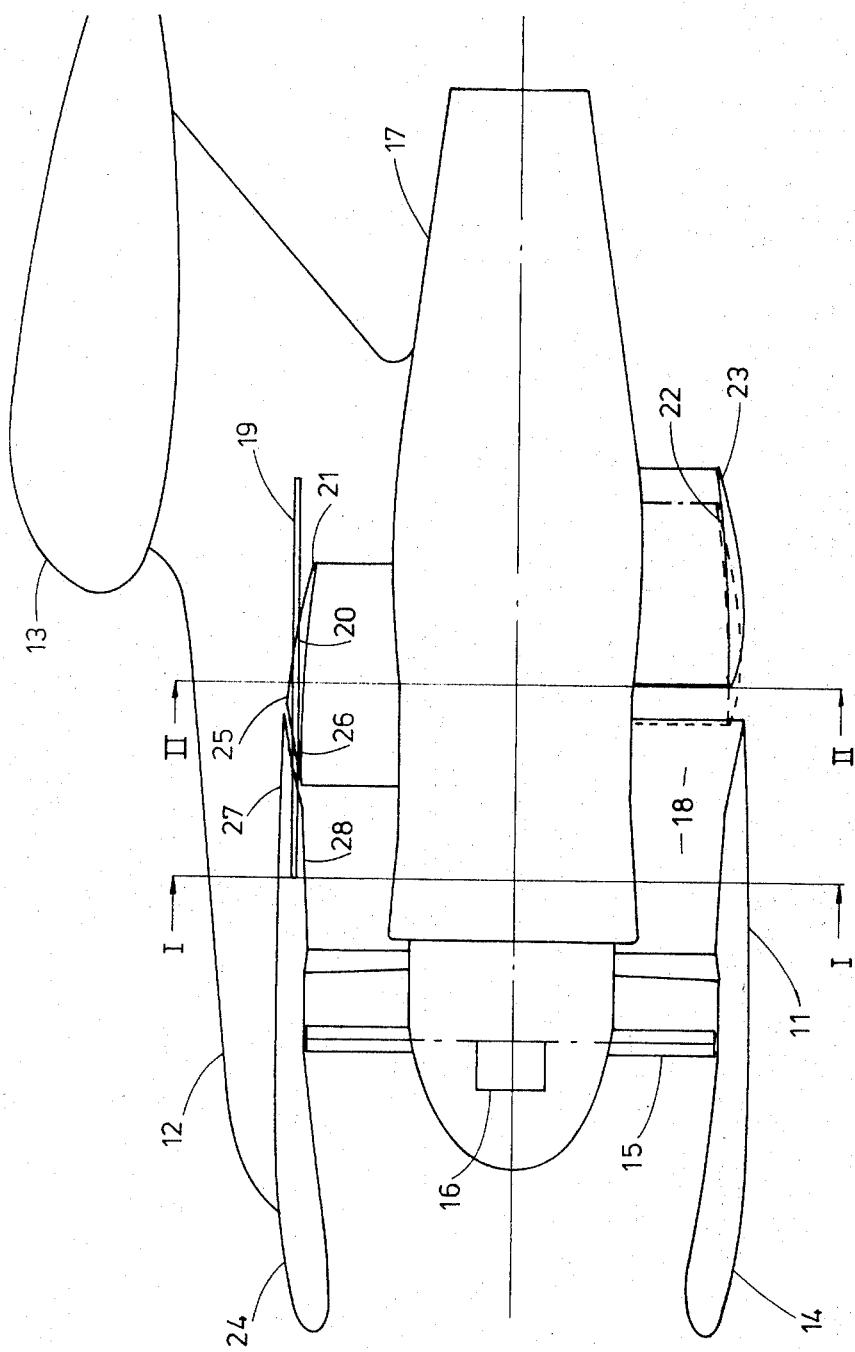

United States Patent [19]

Clark

[11] 3,820,719

[45] June 28, 1974

[54] GAS TURBINE ENGINES

[75] Inventor: Kenneth William Clark, Bristol, England

[73] Assignee: Rolls-Royce (1971) Limited, London, England

[22] Filed: Apr. 30, 1973

[21] Appl. No.: 355,425

[30] Foreign Application Priority Data
May 9, 1972   Great Britain ................... 21659/72

[52] U.S. Cl. ......................... 239/265.31, 60/226 A
[51] Int. Cl. ............................................. F02k 3/04
[58] Field of Search...... 239/265.11, 265.31, 265.13; 60/264, 271, 226 R, 226 A

[56] References Cited
UNITED STATES PATENTS
3,058,302   10/1962   Kuzyk .................................. 60/264
3,508,517   4/1970   Hannan ............................ 60/271 X Primary Examiner—M. Henson Wood, Jr.
Assistant Examiner—Michael Y. Mar
Attorney, Agent, or Firm—Stevens, Davis, Miller & Mosher

[57] ABSTRACT

A fan type gas turbine engine for use in an aircraft, the engine having a fan cowl comprising at least two annular parts, one part being axially separable from the remainder of the fan cowl to provide an annular opening giving additional nozzle area during take-off conditions and being shaped to promote attachment of the extra nozzle flow to its outer surface; and, if the fan is a variable pitch fan, the additional nozzle area can serve as additional intake area for the fan during operation in the reverse pitch mode.

8 Claims, 10 Drawing Figures

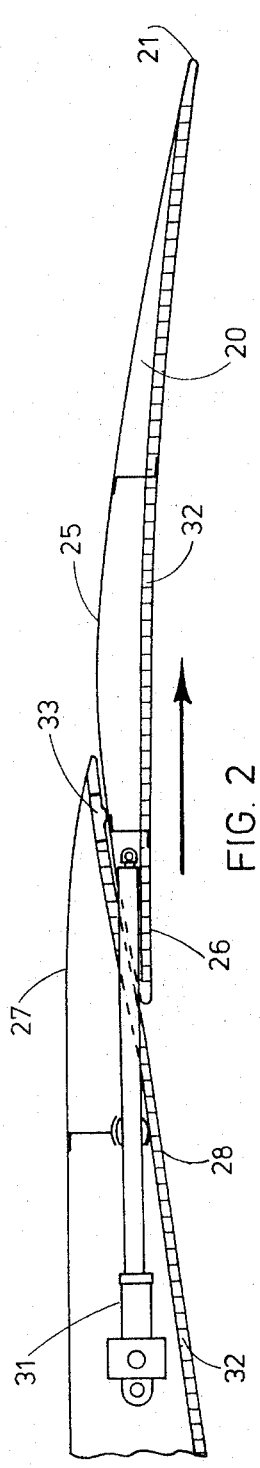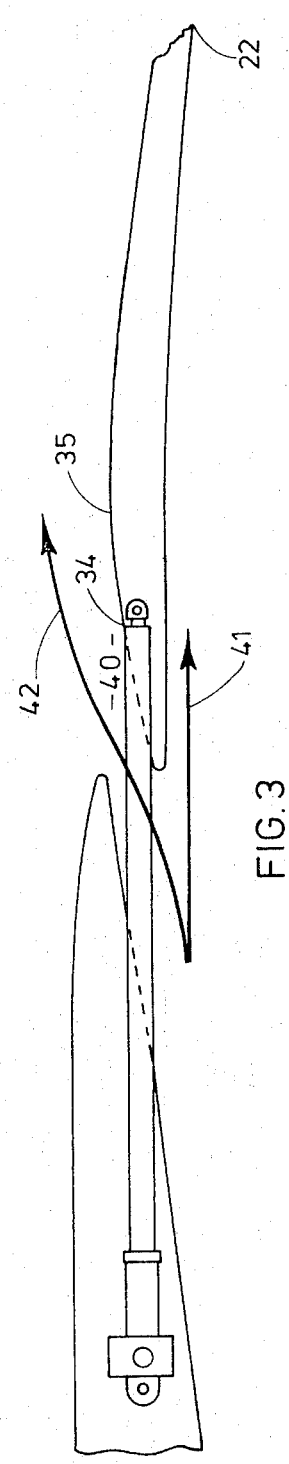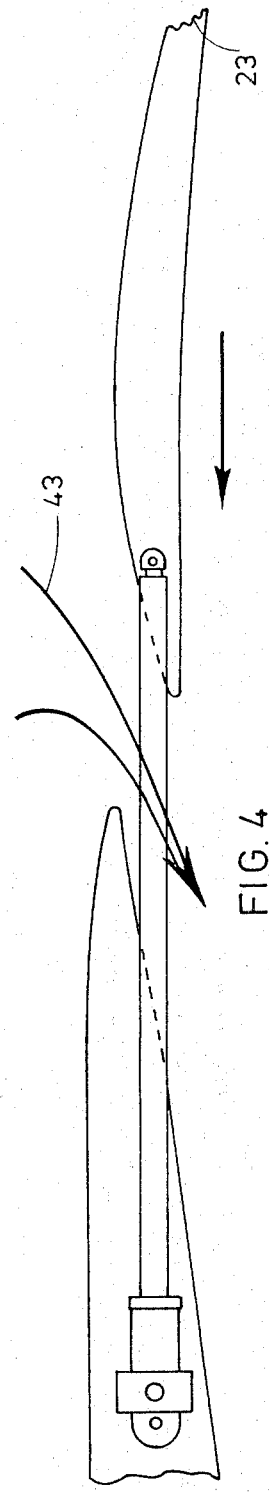

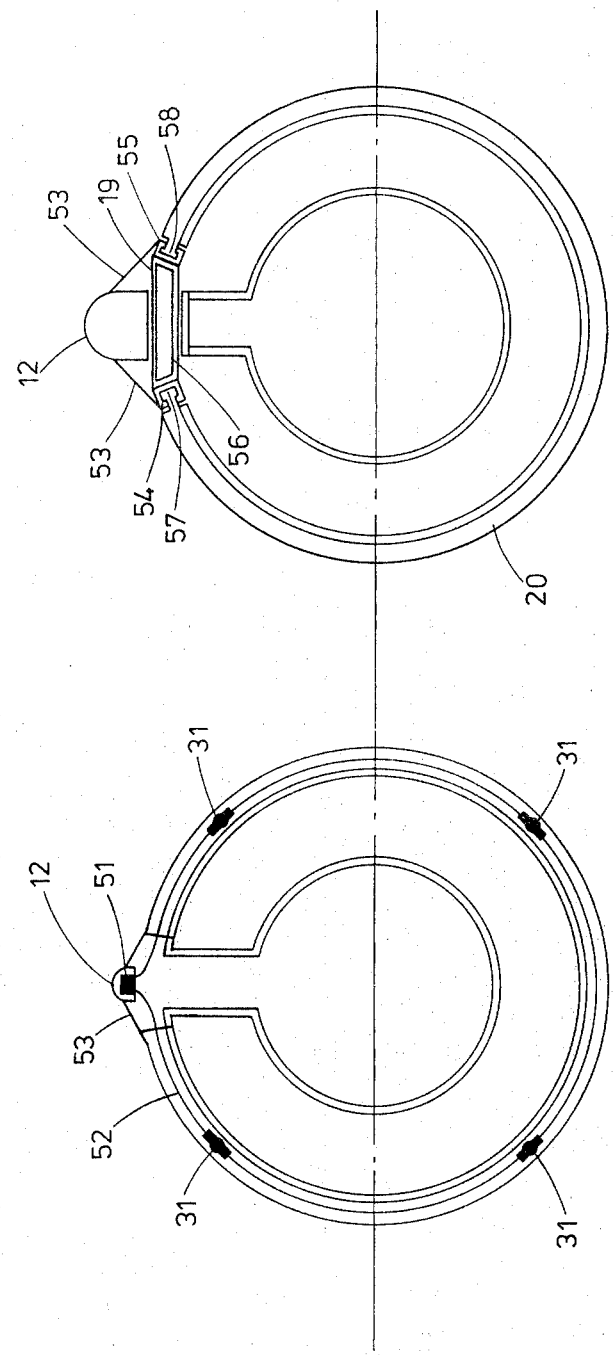

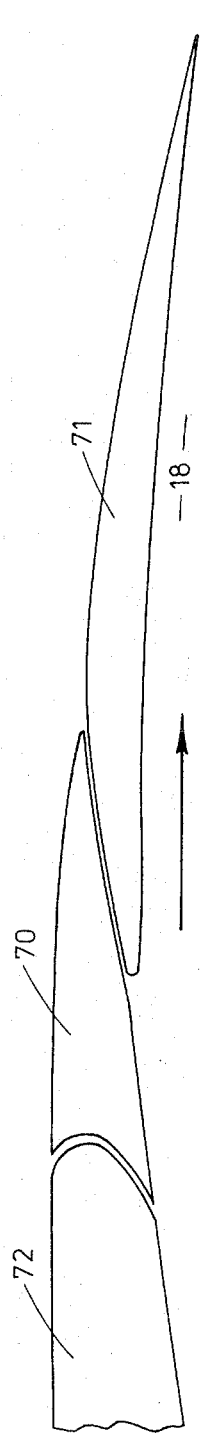
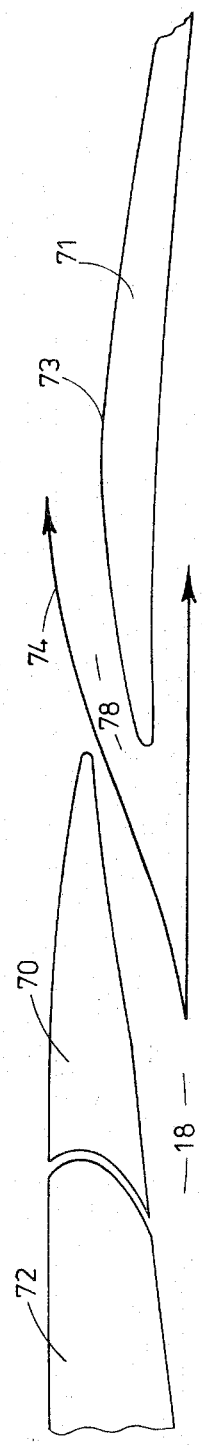
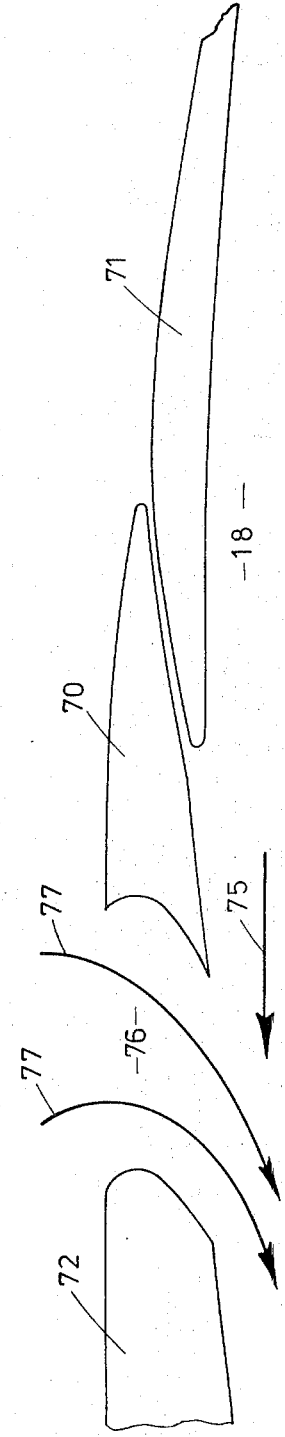
FIG. 8
FIG. 9
FIG. 10

GAS TURBINE ENGINES

This invention relates to nozzles for gas turbine engines, and relates in particular to nozzles for variable pitch fan gas turbine engines.

In a variable pitch fan engine a fan delivers compressed air to a bypass duct formed between a cowling surrounding the fan (a fan cowl) and a core engine which drives the fan. The pitch of the fan blades may be varied to match the performance of the engine to the flight envelope of an aircraft in which it is installed. Thus for take off conditions the fan blades are set in coarse pitch and deliver the maximum amount of air through the bypass duct, for cruise conditions the blades are set to a finer pitch and deliver a lesser amount of air through the duct, and, on landing, reverse pitch is selected to reverse the direction of flow through the duct and exert a braking force on the aircraft. In such engines it is necessary to alter the cross-sectional flow area of the nozzle formed between the end of the fan cowl and the core engine to suit the pitch of the fan blades, and in particular this nozzle must act as an auxiliary intake for the engine when it is operating in the reversed pitch mode.

According to this invention a nozzle for a gas turbine engine comprises a cowl which defines the nozzle area and which includes a fixed portion and a portion axially movable in relation to the fixed portion to form an opening thereby defining additional nozzle area, and wherein the surfaces forming the opening are shaped to direct flow through the opening and to promote attachment of said flow to the surface of the cowl.

Preferably the gas turbine engine is a ducted fan engine in which the cowl defines the fan duct.

In one embodiment of the invention the gas turbine engine is a variable pitch fan engine.

In a variable pitch fan engine the opening in the fan cowl may serve as an intake when the fan is operating in the reversed thrust mode.

The size of the opening when operating as an intake may differ from its size when operating as a nozzle.

Thus, a nozzle for a variable pitch fan engine may comprise a fan cowl, which defines the nozzle area, and which includes a fixed portion, and a portion axially movable in relation to the fixed portion from a first position in contact with the fixed portion, to a second position, in which it is axially spaced therefrom, and which is further movable to a third position in which it defines an intake for the engine, when said engine is operating in the reversed pitch mode.

Also according to this invention a nozzle for a variable pitch fan engine comprises a cowl which defines the nozzle area and includes an upstream portion and relatively axially movable first and second downstream portions and wherein the second downstream portion is separable from the upstream and the first downstream portions to provide additional nozzle area and the first downstream portion is separable from the upstream portion to define an opening which provides additional intake area during reversed pitch operation of the fan.

Figure 7:
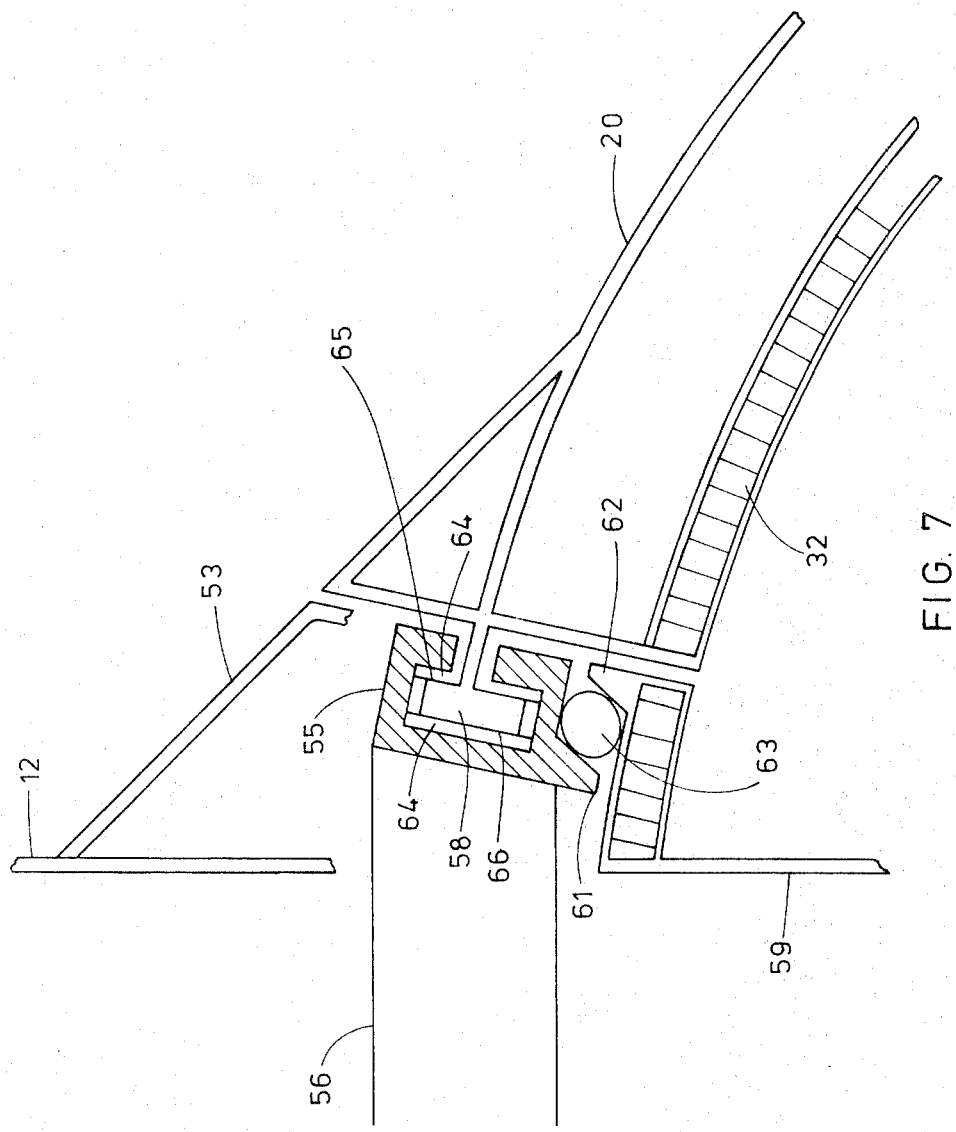

An embodiment of the invention will now be described by way of example only with reference to the accompanying drawings wherein:

FIG. 1 is a longitudinal section through a variable pitch fan engine showing a nozzle constructed in accordance with the invention, FIG. 2 is a half section through the nozzle of the engine of FIG. 1 shown in a first operating position, FIG. 3 shows a second operating position of the nozzle of FIG. 1, FIG. 4 shows a third operating position of the nozzle of FIG. 1, FIG. 5 is a section on the line I—I of FIG. 1, FIG. 6 is a section on the line II—II of FIG. 1, FIG. 7 illustrates the sealing of the nozzle of the engine of FIG. 1, FIG. 8 shows a first operating position of an alternative embodiment of the invention, FIG. 9 shows a second operating position of the embodiment of FIG. 8, and, FIG. 10 shows a third operating position of the embodiment of FIG. 8.

In FIG. 1 a gas turbine engine 11 is shown attached by a pylon 12 to a wing 13 of an aircraft (not shown). The engine comprises a fan cowl 14 which surrounds a fan 15 and has a fixed upstream portion and an axially movable downstream portion 20. The pitch of the fan blades may be varied by means of a pitch change mechanism 16, the fan being driven by a core engine 17 and delivering air to a bypass duct 18 formed between the fan cowl and the core engine.

The area of the nozzle formed by the rear part of the fan cowl and the core engine may be altered by translating the movable portion 20 of the fan cowl rearwards. Preferably, this movable portion forms a complete annulus as, in this way, the strength necessary to contain the gas pressures acting on the portion may readily be achieved by a light structure.

The annulus is translated rearwards along a guide rail 19 from a first position 21, for cruise conditions, to a second position 22 for take-off conditions and to a third position 23 during reversed thrust.

In the first position 21 the annulus abuts the fixed portion of the fan cowl 24 so that its outer and inner surfaces 25, 26 respectively form a continuous profile with the outer and inner surfaces 27, 28 of the forward portion of the fan cowl.

FIGS. 2, 3 and 4 illustrate in more detail how the nozzle area variations alter the gas flow capacity of the nozzle. In FIG. 2 the annulus 20 is shown in the first position lying flush with the fan cowl 24.

This section is taken at a different angle through the engine than the section of FIG. 1 and includes one of four screw jacks 31 used to translate the annulus. It will be seen that the fan cowl is lined with sound absorbing material 32. An inflatable seal 33 prevents gas escaping through the space between the portions of the fan cowl when in the first position.

In FIG. 3 the screw jack has been extended to separate the two portions of the fan cowl sufficiently to permit some of the air to flow down the duct in the direction shown by the arrow 41 and for the remainder to pass in the direction 42 and out through the opening 40. The surfaces 34 of the portions of the fan cowl that form the opening 40 are so shaped that the flow through them attaches to the outer surface 35 of the movable portion, thus no drag penalty is incurred by the flow breaking away from the fan cowl.

In FIG. 4 the screw jack has been further extended, and, with the fan operating in the reversed pitch mode, the direction of flow down the duct is reversed and the nozzle is now acting as an intake for the fan. It will be seen that additional "intake" area is achieved by the influx of air between the two portions of the fan cowl, in the direction 43.

The four screw jacks 31 are of the recirculating ball type and driven by a flexible drive arranged as shown in FIG. 5. An air motor 51 drives the jacks through a cable (not shown) running in a conduit 52 situated in the fixed portion of the fan cowl 24. The air motor is conveniently housed in the space provided by the forward end of the pylon 12 and the fillet fairings 53.

Screw jacks are preferred to hydraulic ones as they are easier to synchronise and the arrangement shown provides that in the event of one of the jacks failing the remaining jacks will still operate effectively.

In FIG. 6 a section through the guide rail 19 which guides the movement of the annulus 20 of the fan cowl may be seen. The pylon 12 and the associated fillet fairing 53 enclose the guide rail which comprises two guides 54, 55 lying parallel to the axis of the duct and connected to the pylon and each other by tie pieces 56 disposed at intervals along the length of the guides. Because of the pressure differential between the inside and outside of the duct there is a hoop stress set up in the fan cowl and this stress is transmitted round the circumference of the fan cowl via the tie pieces 56. In addition to the circumferential seal 56 which prevents gas leakage through the joint between the two portions of the fan cowl, it is necessary to prevent gas leakage between the fan cowl and the guide rail. FIG. 7 illustrates how this is done.

There are two possible paths by which gas from the duct can escape past the guide rails.

The first path is between the pylon 59 that supports the core engine and the guide rail 55 and this may be simply prevented by raising a flange 61 on the guide 55 and a flange 62 on the pylon and interposing a resilient sealing member 63, for example a cylindrical rubber strip, between the two flanges.

The second possible path is around the tee piece 58 that engages the guide 55. This leakage may be stopped by lining the guide with a resilient layer 64, of, for example, polytetraflouroethylene. As the guide not only guides the movement of the part 20 but also supports its weight the tee piece 58 will tend to tip in a clockwise direction and two line seals will be formed between the tee piece and the resilient layer at 65 and 66. Polytetraflouroethylene is the preferred material as its lubricating properties aid the translation of the portion of the fan cowl.

An alternative embodiment of the invention is illustrated in FIGS. 8, 9, 10 each of which show a half section through a fan cowl. This fan cowl comprises first and second axially movable annular portions 70, 71 arranged so that in a first position the two movable portions are in close contact with a third fixed portion 72. When extra nozzle area is required for take off then the part 71 is translated rearwards to a second position in which air flowing down the duct 18 may flow through the opening 78 in the fan cowl and over its outer surface 73 as indicated by the arrow 74. For reversed thrust conditions, in which the direction of flow down the duct as represented by the arrow 75 is reversed, the portions 70 and 71 are moved together to a third position in which they define an opening 76. Air may flow in the direction of the arrows 77 through this opening thus providing additional intake area. The shape of the surfaces defining this opening are such as to promote attachment of flow to the interior surface of the fixed portion of the fan cowl. It will be appreciated that the guide rails, drives, and sealing arrangements as described in relation to the first embodiment may readily be applied to this embodiment.

It is not strictly necessary that a complete annular part of the fan cowl should be translated rearwards but this is preferred as it results in a lighter structure.

What I claim is:

1. A nozzle for a ducted fan gas turbine engine having fan cowl means defining the nozzle area, means for relatively axially separating an upstream portion and a downstream portion of the fan cowl means to define an opening therebetween, means for directing a portion of the nozzle flow through said opening and for promoting attachment of the nozzle flow to the outer surface of the said downstream portion.

2. A nozzle for a gas turbine engine according to claim 1 and wherein the said ducted fan engine comprises a variable pitch fan engine.

3. A nozzle for a gas turbine engine according to claim 2 and wherein the said opening in the fan cowl means defines intake means for reversed thrust operation of the fan.

4. A nozzle for a gas turbine engine according to claim 3 wherein the size of said opening when operating as a nozzle differs from the size of said opening when defining intake means for reversed thrust operation of the fan.

5. A nozzle according to claim 1 and comprising guide rail means for supporting one of said upstream or downstream portions for movement relative to the other of said portions.

6. A nozzle according to claim 1 and comprising recirculating ball jack means for separating the said upstream and downstream portions.

7. A nozzle according to claim 1 and including sealing means between the said axially relatively separable portions.

8. A nozzle for a variable pitch fan engine comprising a fan cowl which together with a core engine defines the nozzle area, the fan cowl having an upstream portion and first and second downstream portions characterised in that there is provided means for relatively axially separating the second downstream portion from the upstream and first downstream portion to provide additional nozzle area and means for separating the first and second downstream portions from the upstream portion to define an opening, the opening defining intake means for reversed thrust operation of the fan.

* * * * *